(12) United States Patent
Takakura et al.

(10) Patent No.: US 9,546,882 B2
(45) Date of Patent: Jan. 17, 2017

(54) ELECTRONIC APPARATUS AND PROGRAM

(71) Applicants: SEIKO INSTRUMENTS INC., Chiba-shi, Chiba (JP); ASICS Corporation, Kobe-shi, Hyogo (JP)

(72) Inventors: Akira Takakura, Chiba (JP); Hiroshi Shimizu, Chiba (JP); Tomohiro Ihashi, Chiba (JP); Keisuke Tsubata, Chiba (JP); Takehiro Tagawa, Kobe (JP); Ryota Shinayama, Kobe (JP); Youzou Kajita, Kobe (JP)

(73) Assignees: SEIKO INSTRUMENTS INC. (JP); ASICS CORPORATION (JP)

( * ) Notice: Subject to any disclaimer, the term of this patent is extended or adjusted under 35 U.S.C. 154(b) by 0 days.

(21) Appl. No.: 14/424,962

(22) PCT Filed: Sep. 3, 2013

(86) PCT No.: PCT/JP2013/073661
§ 371 (c)(1),
(2) Date: Feb. 27, 2015

(87) PCT Pub. No.: WO2014/034944
PCT Pub. Date: Mar. 6, 2014

(65) Prior Publication Data
US 2015/0226574 A1   Aug. 13, 2015

(30) Foreign Application Priority Data

Sep. 3, 2012  (JP) .................. 2012-193257

(51) Int. Cl.
G01C 21/00 (2006.01)
G01C 22/00 (2006.01)
A43B 3/00 (2006.01)

(52) U.S. Cl.
CPC .......... G01C 22/006 (2013.01); A43B 3/0005 (2013.01)

(58) Field of Classification Search
CPC .............. G01C 22/006; A63B 69/0028; A63B 71/0686
(Continued)

(56) References Cited

U.S. PATENT DOCUMENTS

2001/0049890 A1* 12/2001 Hirsch ................ A43B 3/0005
36/132
2007/0006489 A1* 1/2007 Case, Jr. ............. A43B 3/0005
36/132
(Continued)

FOREIGN PATENT DOCUMENTS

JP   59052391     3/1984
JP   02 59419     5/1990
(Continued)

OTHER PUBLICATIONS

International Search Report mailed Nov. 12, 2013 issued in International Appln. No. PCT/JP2013/073661 together with English translation thereof.
(Continued)

Primary Examiner — Lincoln Donovan
Assistant Examiner — Thomas Skibinski
(74) Attorney, Agent, or Firm — Adams & Wilks

(57) ABSTRACT

An electronic apparatus includes a sensor, a body that is provided separately from and is not incorporated to a shoe worn by a user, and a processing circuit provided on the body. The processing circuit obtains, based on a detection result of the sensor, a number of steps taken by the user during traveling while wearing the shoe, and calculates a wear degree, indicating a degree to which the shoe of the user is worn out, based on the number of steps.

15 Claims, 10 Drawing Sheets

(58) Field of Classification Search
USPC .................... 377/24.2; 340/669, 540, 665
See application file for complete search history.

(56) References Cited

U.S. PATENT DOCUMENTS

| 2009/0267783 | A1* | 10/2009 | Vock | A43B 1/0036 |
| | | | | 340/669 |
| 2009/0278707 | A1* | 11/2009 | Biggins | A43B 1/0027 |
| | | | | 340/870.16 |
| 2012/0150488 | A1* | 6/2012 | Kamiyama | G01C 22/006 |
| | | | | 702/160 |

FOREIGN PATENT DOCUMENTS

| JP | 2001321202 | 11/2001 |
| JP | 2009500141 | 1/2009 |
| JP | 2009273785 | 11/2009 |
| JP | 2010505451 | 2/2010 |
| WO | 2007128049 | 11/2007 |

OTHER PUBLICATIONS

Notice of Reasons for Rejection mailed Sep. 27, 2016 issued in Japanese Application No. 2012-193257 together with English-language translation thereof.

* cited by examiner

ELECTRONIC APPARATUS AND PROGRAM

BACKGROUND OF THE INVENTION

Field of the Invention

The present invention relates to an electronic apparatus and a program.

Priority is claimed on Japanese Patent Application No. 2012-193257, filed Sep. 3, 2012, the content of which is incorporated herein by reference.

Related Art

In the related art, a wristwatch for running is known in which an acceleration sensor detects the movement of a user to detect the number of steps or the traveling distance during traveling (for example, refer to Patent Document 1). Such a wristwatch includes means for measuring the number of steps and the distance per run; and means for accumulating the number of steps and the distance per month. In addition, shoes are worn out when being used, and the unique performance of the shoes gradually decreases when being worn out.

REFERENCE DOCUMENT

Patent Document

[Patent Document 1] Japanese Unexamined Utility Model Application, First Publication No. H2-59419

However, there is a problem in that, even when the appearance of shoes is observed, it is difficult to determine the wear degree of the shoes such as the wear degree of a midsole. In addition, the wristwatch described in Patent Document 1 can measure the results (for example, the number of steps, distance, and time) of running but cannot measure the wear degree of shoes used for running.

SUMMARY OF THE INVENTION

Therefore, the present invention has been made in consideration of the above-described circumstances, and an object thereof is to provide an electronic apparatus capable of measuring the wear degree of shoes used for running, and a program therefor.

According to a first aspect of the present invention, there is provided an electronic apparatus including: a measuring unit that measures a number of steps of a user during traveling; and a wear degree calculating unit that calculates a wear degree, indicating a degree to which shoes of the user are worn out, based on the number of steps measured by the measuring unit.

In addition, according to a second aspect of the present invention, in the electronic apparatus according to the first aspect, the wear degree calculating unit may convert the number of steps measured by the measuring unit into the wear degree using a coefficient in consideration of information relating to the user In addition, according to a third aspect of the present invention, in the electronic apparatus according to the second aspect, the information relating to the user may be a body weight of the user, a traveling speed of the user, a running level of the user, or a gender of the user.

In addition, according to a fourth aspect of the present invention, the electronic apparatus according to any one of the first to third aspects may further include: a display unit; a storing unit that stores a cumulative value of the wear degree; a cumulative value calculating unit that adds the wear degree, which is calculated by the wear degree calculating unit, to the cumulative value of the wear degree, which is stored in the storing unit, to calculate a new cumulative value of the wear degree; a cushioning property calculating unit that calculates cushioning properties of the shoes based on the cumulative value of the wear degree calculated by the cumulative value calculating unit; and a display control unit that displays the cushioning properties of the shoes, which is calculated by the cushioning property calculating unit, on the display unit.

In addition, according to a fifth aspect of the present invention, the electronic apparatus according to the fourth aspect may further include: a select unit that selects shoes, in which the storing unit stores a cumulative value of the wear degree for each pair of shoes of the user, the cumulative value calculating unit reads the cumulative value of the wear degree of the shoes, which are selected by the select unit, from the storing unit, and adds the wear degree, which is calculated by the wear degree calculating unit, to the read cumulative value of the wear degree to calculate a new cumulative value of the wear degree of the shoes selected by the select unit, and the cushioning property calculating unit calculates cushioning properties of the shoes, which are selected by the select unit, based on the cumulative value of the wear degree calculated by the cumulative value calculating unit.

In addition, according to a sixth aspect of the present invention, the electronic apparatus according to the fourth or fifth aspect may further include: an input unit that receives an input of an instruction to initialize the wear degree; and an initializing unit that initializes, when the instruction to initialize the wear degree is input to the input unit, the cumulative value of the wear degree stored in the storing unit.

In addition, according to a seventh aspect of the present invention, the electronic apparatus according to any one of the first to sixth aspects may further include: an acceleration sensor that detects an acceleration, in which the measuring unit measures a number of steps based on the acceleration detected by the acceleration sensor.

In addition, according to an eighth aspect of the present invention, the electronic apparatus according to any one of the first to sixth aspects may further include: an acceleration sensor that detects an acceleration; and a timekeeping unit that keeps time, in which the measuring unit measures a traveling pitch of the user within a predetermined amount of time based on the acceleration detected by the acceleration sensor, and measures a number of steps of the user during traveling based on the measured traveling pitch and a traveling time of the user.

In addition, according to a ninth aspect of the present invention, in the electronic apparatus according to the seventh or eighth aspect, the acceleration sensor may be built into a wristwatch including a display unit on which information relating to the wear degree calculated by the wear degree calculating unit is displayed.

In addition, according to a tenth aspect of the present invention, in the electronic apparatus according to the seventh or eighth aspect, the acceleration sensor may be built into an apparatus which is mountable on the shoes of the user.

In addition, according to an eleventh aspect of the present invention, in the electronic apparatus according to the seventh or eighth aspect, the acceleration sensor may be built into the shoes of the user.

In addition, according to a twelfth aspect of the present invention, there is provided a program causing a computer to execute the following steps including: a step of measuring a number of steps of a user during traveling; and a step of calculating a wear degree, indicating a degree to which shoes of the user are worn out, based on the measured number of steps.

According to the present invention, the measuring unit measures a number of steps of a user during traveling. In addition, the wear degree calculating unit calculates a wear degree, indicating a degree to which shoes of the user are worn out, based on the number of steps measured by the measuring unit. As a result, the wear degree of the shoes of the user can be calculated based on the number of steps of the user during traveling. That is, the wear degree is calculated by using the number of steps of the user during traveling as an index indicating a degree to which the shoes are used up. Accordingly, the wear degree of the shoes used for running can be measured.

DETAILED DESCRIPTION OF THE INVENTION (First Embodiment)

Figure 1:
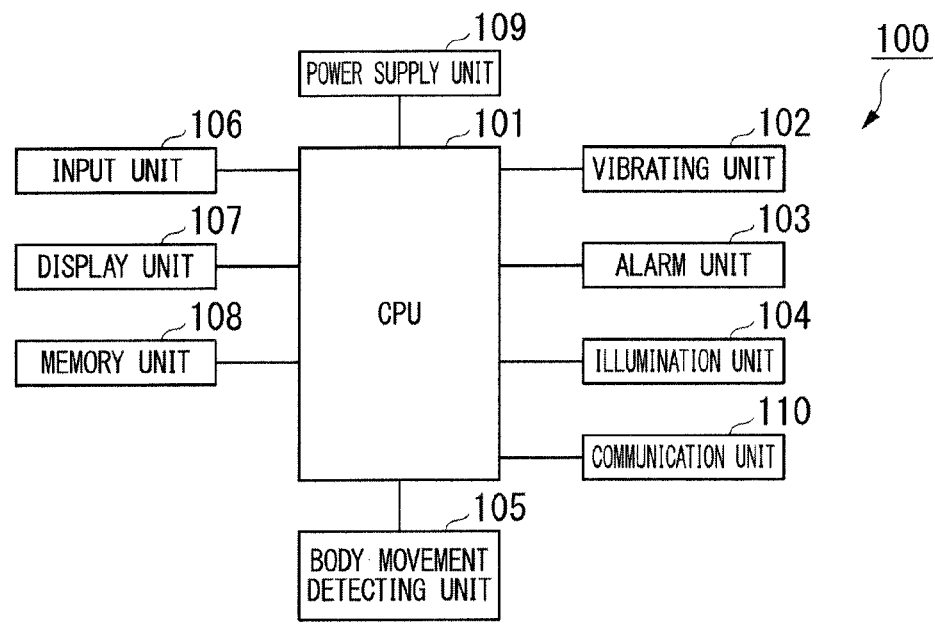
FIG. 1 is a block diagram illustrating a configuration of a wristwatch according to a first embodiment of the present invention.

Hereinafter, a first embodiment of the present invention will be described with reference to the drawings. In the embodiment, an example of a wristwatch will be described as an example of an electronic apparatus. FIG. 1 is a block diagram illustrating a configuration of a wristwatch 100 according to the embodiment. The wristwatch 100 is an electronic watch that calculates and displays the cushioning properties of shoes (in particular, running shoes) of a user to calculate the wear degree of the shoes. The cushioning properties of the shoes refer to performance of absorbing shock to the shoes (shock-absorbing properties) and, particularly, refer to buffer power of a midsole. In the example illustrated in the drawing, the wristwatch 100 includes a CPU 101 (wear degree calculating unit, cumulative value calculating unit, cushioning property calculating unit, display control unit), a vibrating unit 102, an alarm unit 103, an illumination unit 104, a body movement detecting unit (measuring unit) 105, an input unit 106, a display unit 107, a memory unit (storing unit) 108, a power supply unit 109, and a communication unit 110.

The body movement detecting unit 105 includes an acceleration sensor that detects an acceleration, and measures the number of steps of a user during traveling. Specifically, the body movement detecting unit 105 measures the number of steps of a user during traveling using (Method 1) or (Method 2).

(Method 1) The body movement detecting unit 105 detects a vertical body vibration during traveling with an acceleration sensor and measures the number of steps of the user during traveling. According to (Method 1), the number of steps can be measured with higher accuracy as compared to (Method 2).

(Method 2) The body movement detecting unit 105 detects a vertical body vibration during traveling with an acceleration sensor, measures the number of steps of the user within a predetermined amount of time (for example, one minute), and measures a traveling pitch (number of steps/min) of the user. The traveling pitch refers to the number of steps per minute. The body movement detecting unit 105 multiplies the measured traveling pitch by a traveling time (unit: min) during which the user travels so as to measure the number of steps of the user during traveling. In this (Method 2), the number of steps is measured by the acceleration sensor only within a predetermined amount of time (for example, one minute), and thus the number of steps during the entire period of the traveling time is measured after completion of the traveling of the user. Therefore, in (Method 1), it is necessary that the number of steps must be measured by the acceleration sensor while the user travels. However, according to (Method 2), it is sufficient that the number of steps is measured by the acceleration sensor only within a predetermined amount of time, and thus a processing load on the wristwatch 100 can be reduced.

The CPU 101 controls each unit included in the wristwatch 100. For example, using a coefficient in consideration of information relating to the user, the CPU 101 converts the number of steps measured by the body movement detecting unit 105 into a wear degree indicating a degree to which shoes of the user are worn out. Examples of the information relating to the user include a body weight of the user, a traveling speed of the user, a running level of the user, and a gender of the user. The traveling speed refers to the running quickness. The running level refers to, for example, an index indicating the time or the running ability of the user when running a predetermined distance. In addition, the CPU 101 reads the cumulative value of the wear degree from the memory unit 108, and adds the calculated wear degree to the read cumulative value to calculate a new cumulative value of the wear degree. The CPU 101 overwrites the memory unit 108 with the calculated cumulative value of the wear degree as a cumulative value of the wear degree of the shoes. In addition, the CPU 101 calculates cushioning properties of the shoes based on the calculated cumulative value of the wear degree. The CPU 101 displays the calculated cushioning properties of the shoes on the display unit 107.

The vibrating unit 102 generates a reference clock signal for the operation of the CPU 101 or a clock signal for timekeeping. The CPU 101 and the vibrating unit 102 are the timekeeping units for keeping the time. The timekeeping unit realizes a stopwatch function for keeping the traveling time of the user or a clock function for displaying the present clock time. The alarm unit 103 is a sound generating device that generates a check sound or a warning sound. The illumination unit 104 is a backlight that illuminates the display unit 107.

The input unit 106 is configured of a switch capable of being manipulated from the outside and receives an input. For example, the input unit 106 receives an input of the information relating to the user such as the body weight or running level of the user. In addition, the input unit 106 receives an input of an instruction to start the measurement of the number of steps or an input of an instruction to end the measurement of the number of steps. The display unit 107 is, for example, a liquid crystal display and displays the clock time, information relating to the cushioning properties of the shoes of the user, and the like. The memory unit 108 is configured of a ROM (Read Only Memory) or a RAM (Random Access Memory) and stores the cumulative value of the number of steps of the user during traveling or the cumulative value of the wear degree of the shoes of the user.

The initial values of the cumulative value of the number of steps and the cumulative value of the wear degree of the shoes are "0". In addition, the memory unit 108 stores a program which is executed by the CPU 101 in advance. The power supply unit 109 supplies electrical power to each unit included in the wristwatch 100. The communication unit 110 communicates with other apparatuses.

Next, a relationship between the cushioning properties of the shoes and the wear degree thereof will be described. The lower the wear degree of the shoes, the higher the cushioning properties of the shoes, and the higher the wear degree of the shoes, the lower the cushioning properties of the shoes. The lower the amount of usage of the shoes, the lower the wear degree of the shoes, and the higher the amount of usage of the shoes, the higher the wear degree of the shoes. Therefore, the wristwatch 100 according to the embodiment measures the number of steps of the user during traveling as the amount of usage of the shoes and converts the measured number of steps into the wear degree of the shoes. The wristwatch 100 calculates and displays cushioning properties of the shoes based on the converted wear degree.

Hereinafter, a method of calculating the wear degree of the shoes will be described. W refers to the cumulative value of the wear degree of the shoes. The wear degree W of the shoes is calculated from the following equation (1).

$$W=\Sigma(P) \times a \times b \times c \qquad (1)$$

However, a, b, and c refer to coefficients in consideration of the information relating to the user. a refers to the coefficient in consideration of the body weight of the user, b refers to the coefficient in consideration of the traveling speed of the user, and c refers to the coefficient in consideration of the running level of the user.

Figure 2:
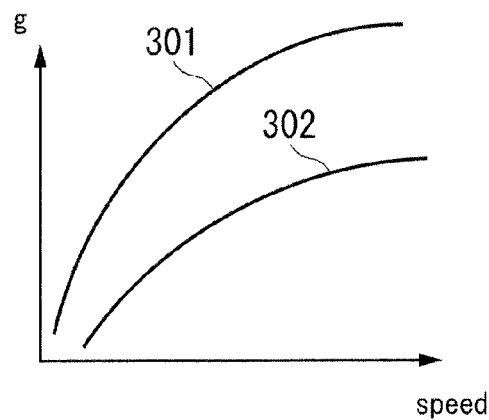
FIG. 2 is a graph illustrating a relationship between a load applied to shoes, and the body weight and the traveling speed in the first embodiment of the present invention.

FIG. 2 is a graph illustrating a relationship between a load applied to shoes, and the body weight and the traveling speed in the embodiment. In the graph shown in this drawing, the vertical axis represents the load g applied to the shoes, and the horizontal axis represents the traveling speed. A curve 301 indicates a relationship between a load applied to shoes, and the body weight and the traveling speed of a heavy-weight user. In addition, a curve 302 indicates a relationship between a load applied to shoes, and the body weight and the traveling speed of a light-weight user. As shown in the drawing, the faster the traveling speed, the higher the load applied to the shoes, and the slower the traveling speed, the lower the load applied to the shoes. Therefore, the faster the traveling speed of the user, the higher the coefficient b in consideration of the traveling speed of the user, and the slower the traveling speed of the user, the lower the coefficient b in consideration of the traveling speed of the user. In addition, as compared to the heavy-weight user (curve 301), even at the same traveling speed, the light-weight user (curve 302) applies a lower load to the shoes. Therefore, the heavier the body weight of the user, the higher the coefficient a in consideration of the body weight of the user, and the lighter the body weight of the user, the lower the coefficient a in consideration of the body weight of the user.

Figure 3:
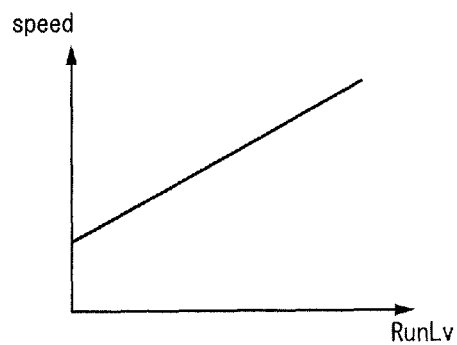
FIG. 3 is a graph illustrating a relationship between the traveling speed and the running level in the first embodiment of the present invention.

FIG. 3 is a graph illustrating a relationship between the traveling speed and the running level in the embodiment. In the graph shown in this drawing, the vertical axis represents the traveling speed speed, and the horizontal axis represents the running level RunLv. As shown in the drawing, the higher the running level, the faster the traveling speed, and the lower the running level, the slower the traveling speed. Therefore, the higher the running level of the user, the higher the coefficient c in consideration of the running level of the user, and the lower the running level of the user, the lower the coefficient c in consideration of the running level of the user Next, the display content indicating the cushioning properties of the shoes which is displayed on the display unit 107 will be described.

Figure 4A:
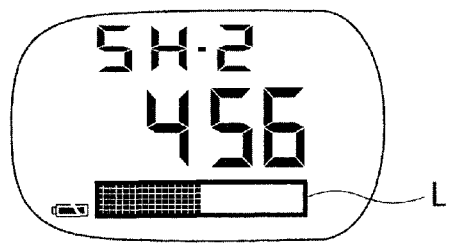
FIG. 4A is a schematic diagram illustrating the display content indicating the cushioning properties of the shoes which is displayed on a display unit in the first embodiment of the present invention.
Figure 4B:
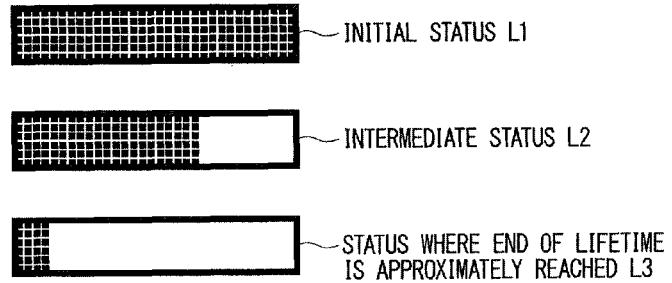
FIG. 4B is a schematic diagram illustrating a display example in which the cushioning properties are indicated in black in a bar L indicating the cushioning properties of the shoes displayed on the display unit in the first embodiment of the present invention.
Figure 4C:
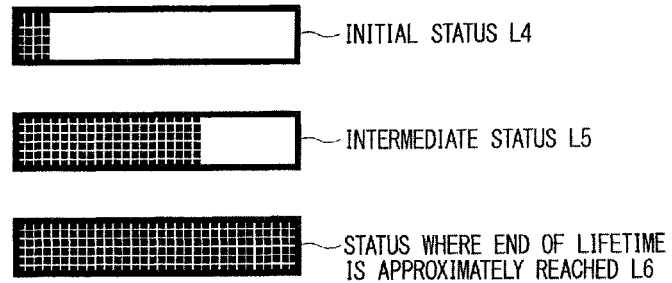
FIG. 4C is a schematic diagram illustrating a display example in which the cushioning properties are indicated in white in the bar L indicating the cushioning properties of the shoes displayed on the display unit in the first embodiment of the present invention.

FIGS. 4A, 4B, and 4C are schematic diagrams illustrating the display content indicating the cushioning properties of the shoes which is displayed on the display unit 107 in the embodiment of the present invention. As shown in FIG. 4A, the display unit 107 displays a bar L indicating the cushioning properties of the shoes along with the present clock time and the battery capacity. In the bar L indicating the cushioning properties of the shoes, a black portion indicates the cushioning properties, and a white portion indicates the wear degree. As shown in FIG. 4, in the bar L indicating the cushioning properties of the shoes, in an initial status L1, the area of the cushioning properties (black portion) is large, and the area of the wear degree (white portion) is small. Moreover, as the lifetime of the shoes is gradually shortened, the area of the cushioning degree (black portion) is decreased (the area of the wear degree (white portion) is increased). That is, when the black portion of the bar L indicating the cushioning properties of the shoes is decreased (when the white portion is increased) as in a status L3 where the end of the lifetime is approximately reached after an intelmediate status L2, the bar L indicates the state where the end of the lifetime of the shoes is approximately reached. As shown in FIG. 4C, the bar L may indicate the wear degree of the shoes. Specifically, when the black portion in the bar L indicates the wear degree of the shoes, the wear degree is low in an initial status L4. Moreover, as the lifetime of the shoes is gradually shortened, the area of the wear degree is increased. When the black portion indicating the wear degree of the shoes is increased as in a status L6 end of the lifetime is approximately reached after an intermediate status L5, the bar L may indicate the state where the end of the lifetime of the shoes is approximately reached.

Figure 5:
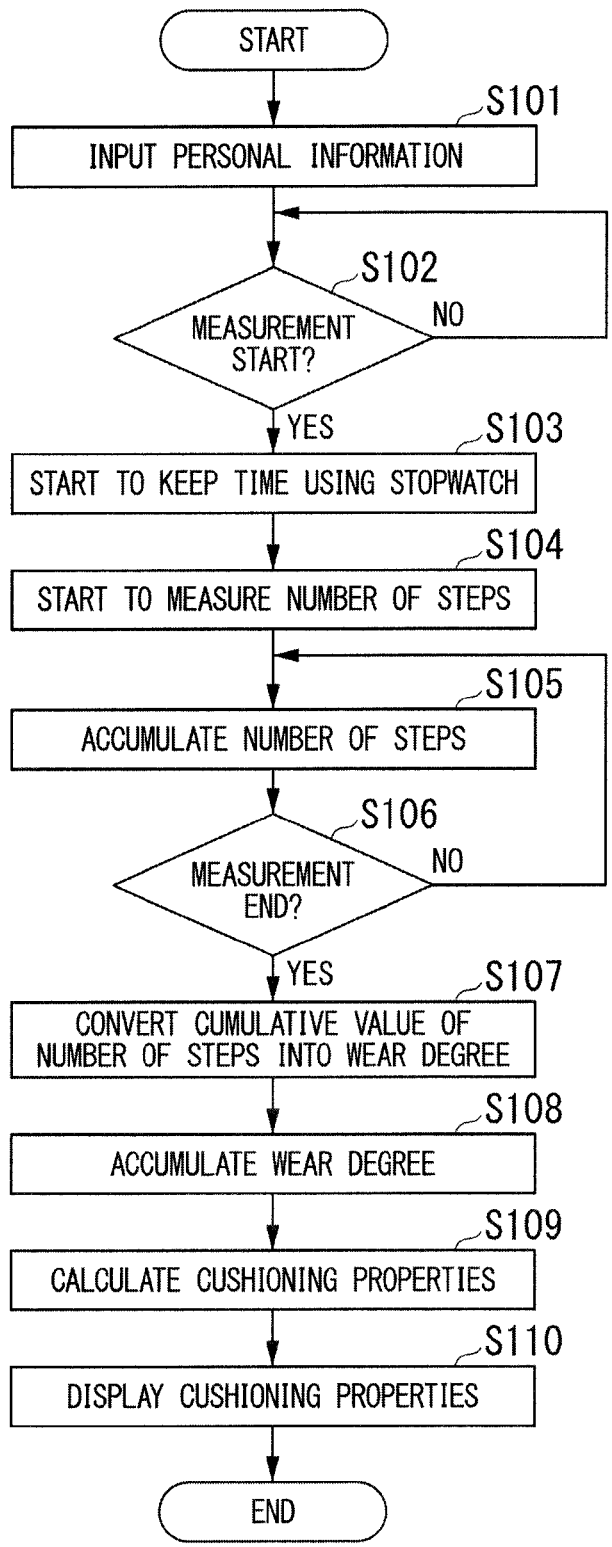
FIG. 5 is a flowchart illustrating the procedure of a cushioning property display process which is executed by the wristwatch according to the first embodiment of the present invention.

Next, a cushioning property display process where the wristwatch 100 according to the embodiment displays the cushioning properties of the shoes on the display unit 107 will be described. FIG. 5 is a flowchart illustrating the procedure of the cushioning property display process which is executed by the wristwatch 100 according to the embodiment.

(Step S101) The CPU 101 receives an input of personal information, which is the information relating to the user, from the input unit 106. The user inputs the personal information by manipulating the input unit 106. The input personal information described herein is the body weight of the user and the running level or gender of the user. Next, the process proceeds to Step S102.

(Step S102) The CPU 101 determines whether or not an instruction to start the measurement of the number of steps is input from the input unit 106. When the instruction to start the measurement is input, the process proceeds to Step S103. When the instruction to start the measurement is not input, the process returns to Step S102.

(Step S103) The CPU 101 starts to keep the time using the stopwatch function. Next, the process proceeds to Step S104.

(Step S104) The CPU 101 starts to measure the number of steps using the body movement detecting unit 105. Next, the process proceeds to Step S105.

(Step S105) The CPU 101 accumulates the number of steps after the start of the measurement. In addition, the CPU 101 calculates the traveling speed by integrating the acceleration detected by the acceleration sensor included in the body movement detecting unit 105. Next, the process proceeds to Step S106.

(Step S106) The CPU 101 determines whether or not an instruction to end the measurement of the number of steps is input from the input unit 106. When the instruction to end the measurement is input, the CPU 101 ends the timekeeping of the stopwatch and the measurement of the number of steps. The process proceeds to Step S107. On the other hand, when the instruction to end the measurement is not input, the process returns to Step S105.

(Step S107) The CPU 101 converts the measured number of steps into the wear degree. Specifically, the CPU 101 determines the coefficient a in consideration of the body weight input in Step S101, the coefficient b in consideration of the running level input in Step S101, and the coefficient c in consideration of the calculated traveling speed to calculate the wear degree from the above-described equation (1). Next, the process proceeds to Step S108.

(Step S108) The CPU 101 reads the cumulative value of the wear degree from the memory unit 108, and adds the calculated wear degree to the read cumulative value to accumulate the wear degree. The CPU 101 writes the memory unit 108 with the accumulated wear degree as a cumulative value of the wear degree. In addition, the CPU 101 adds the calculated number of steps to the cumulative value of the number of steps stored in the memory unit 108, and the memory unit 108 is overwritten with the obtained value. Next, the process proceeds to Step S109.

(Step S109) The CPU 101 calculates cushioning properties based on the accumulated wear degree. Next, the process proceeds to Step S110.

(Step S110) The CPU 101 displays the display content indicating the calculated cushioning properties on the display unit 107. Specifically, the CPU 101 displays the bar L corresponding to the calculated cushioning properties on the display unit 107. Next, the cushioning property display process ends.

As described above, the wristwatch 100 according to the embodiment converts the number of steps during traveling into the wear degree to obtain a degree to which the shoes are used up, and calculates and displays the cushioning properties, which refer to the function of absorbing shock, based on the accumulated wear degree. As a result, the decrease degree of the cushioning properties of the shoes can be recognized.

In addition, in the wristwatch 100 according to the embodiment, not only the number of steps during traveling but also the coefficients in consideration of the information relating to the user such as the body weight, the traveling speed, the running level, and the gender are obtained. Therefore, the decrease degree of the cushioning properties of the shoes corresponding to the characteristics of the user can be recognized with higher accuracy.

(Second Embodiment)

Hereinafter, a second embodiment of the present invention will be described with reference to the drawings. A wristwatch 100 according to this embodiment has the same configuration as that of the wristwatch 100 according to the first embodiment. This embodiment has a difference from the first embodiment, in that the memory unit 108 includes a nonvolatile memory; and the nonvolatile memory stores the cumulative value of the number of steps and the cumulative value of the wear degree. In addition, the CPU 101 transmits the cumulative value of the number of steps and the cumulative value of the wear degree, which are written on the nonvolatile memory, to an external apparatus such as a computer through the communication unit 110. As a result, the cumulative value of the number of steps and the cumulative value of the wear degree can be backed up onto the external apparatus.

Figure 6:
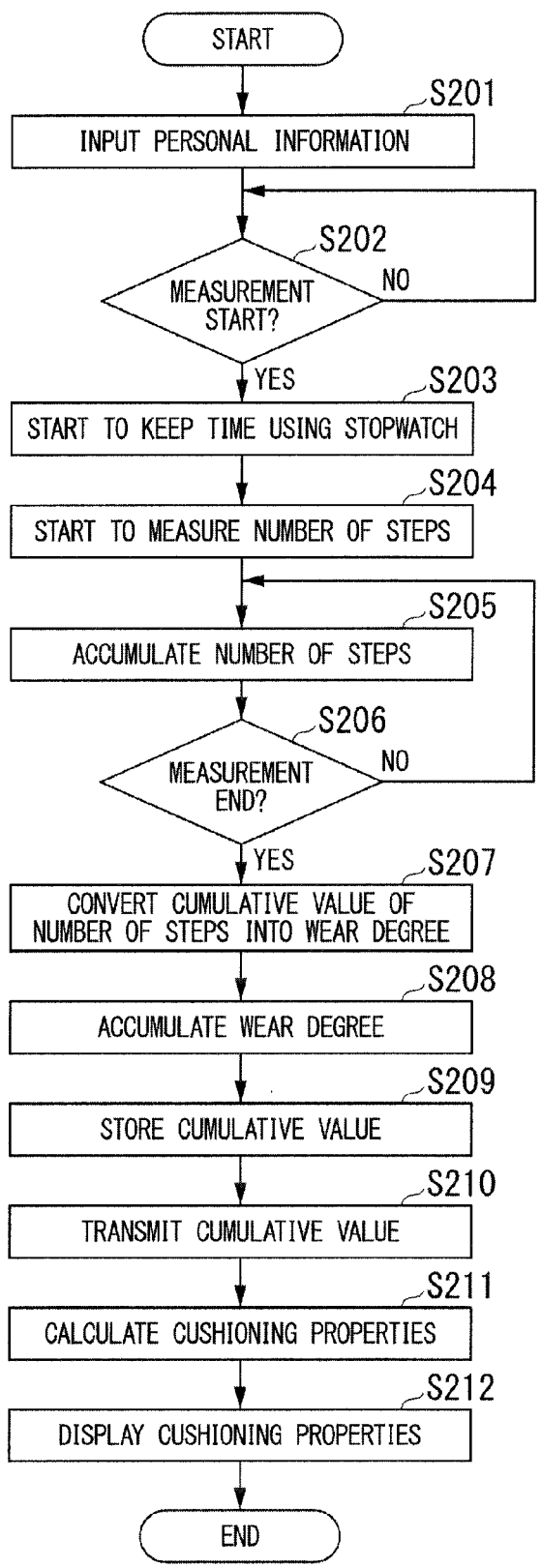
FIG. 6 is a flowchart illustrating the procedure of a cushioning property display process which is executed by a wristwatch according to a second embodiment of the present invention.

Hereinafter, a cushioning property display process where the wristwatch 100 according to the embodiment displays the cushioning properties of the shoes on the display unit 107 will be described. FIG. 6 is a flowchart illustrating the procedure of the cushioning property display process which is executed by the wristwatch 100 according to the embodiment.

Since the processes of Step S201 to Step S208 are the same as the above-described processes of Step S101 to Step S108, the description thereof will be omitted.

(Step S209) After Step S208, the CPU 101 writes the nonvolatile memory of the memory unit 108 with the cumulative value of the wear degree and the cumulative value of the number of steps. Next, the process proceeds to Step S210.

(Step S210) The CPU 101 transmits the cumulative value of the wear degree and the cumulative value of the number of steps to the external apparatus through the communication unit 110. Next, the process proceeds to Step S211.

Since the processes of Step S211 to Step S212 are the same as the above-described processes of Step S109 to Step S110, the description thereof will be omitted.

As described above, in the embodiment, the CPU 101 writes the nonvolatile memory of the memory unit 108 with the cumulative value of the wear degree calculated and the cumulative value of the number of steps. As a result, when a battery of the wristwatch 100 is exchanged, data relating to the cumulative value of the wear degree and the cumulative value of the number of steps can be prevented from being erased.

In addition, in the embodiment, the CPU 101 transmits the cumulative value of the wear degree and the cumulative value of the number of steps to the external apparatus through the communication unit 110. As a result, the cumulative value of the wear degree and the cumulative value of the number of steps can be backed up to the external apparatus. In addition, in the external apparatus, the cushioning properties can be calculated from the cumulative value of the wear degree and displayed.

(Third Embodiment)

Hereinafter, a third embodiment of the present invention will be described with reference to the drawings. A wristwatch 100 according to this embodiment has the same configuration as that of the wristwatch 100 according to the first embodiment. This embodiment has a difference from the first embodiment, in that the cumulative value of the number of steps and the cumulative value of the wear degree can be initialized. The input unit 106 receives an input of an instruction to initialize data relating to the wear degree. When an instruction to initialize the data relating to the wear degree is input from the input unit 106, the CPU 101 (initializing unit) deletes and initializes the cumulative value of the number of steps and the cumulative value of the wear degree stored in the memory unit 108. That is, when the instruction to initialize the data relating to the wear degree is input, the CPU 101 sets the cumulative value of the number of steps and the cumulative value of the wear degree, stored in the memory unit 108, as 0.

Figure 7:
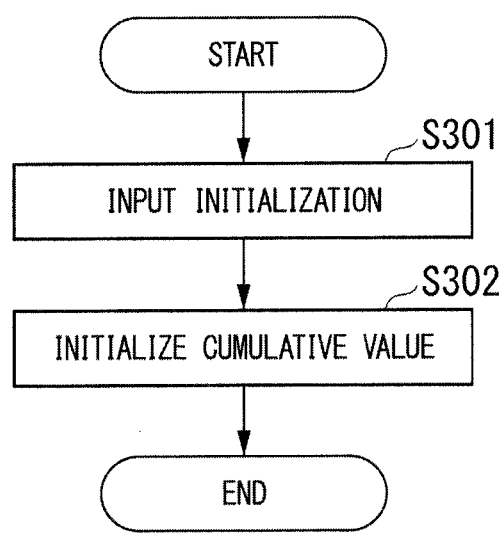
FIG. 7 is a flowchart illustrating the procedure of an initialization process which is executed by a wristwatch according to a third embodiment of the present invention.

Hereinafter, an initialization process where the wristwatch 100 according to the embodiment initializes the data relating to the wear degree of the shoes will be described. FIG. 7 is a flowchart illustrating the procedure of the initialization process which is executed by the wristwatch 100 according to the embodiment.

(Step S301) The CPU 101 receives an input of an instruction to initialize the data relating to the wear degree of the shoes from the input unit 106. The user inputs the instruction to initialize the data relating to the wear degree by manipulating the input unit 106. Next, the process proceeds to Step S302.

(Step S302) The CPU 101 deletes the cumulative value of the number of steps and the cumulative value of the wear degree, which are stored in the memory unit 108, to initialize the cumulative value of the number of steps and the cumulative value of the wear degree. Next, the initialization process ends.

As described above, in the embodiment, when the instruction to initialize the data relating to the wear degree of the shoes is input from the input unit 106, the CPU 101 initializes the cumulative value of the number of steps and the cumulative value of the wear degree. As a result, for example, when the user changes the shoes, data can be initialized.

(Fourth Embodiment)

Hereinafter, a fourth embodiment of the present invention will be described with reference to the drawings. A wristwatch 100 according to this embodiment has the same configuration as that of the wristwatch 100 according to the first embodiment. This embodiment has a difference from the first embodiment, in that the cushioning properties are calculated and displayed for each pair of shoes of the user. The input unit 106 (select unit) receives an input of the selection of shoes. For example, the user selects a pair of shoes from among plural pairs of shoes displayed on the display unit 107. The memory unit 108 stores the cumulative value of the number of steps and the cumulative value of the wear degree for each pair of shoes of the user. Specifically, the memory unit 108 includes plural memories, and each memory stores the cumulative value of the number of steps and the cumulative value of the wear degree corresponding to a pair of shoes. That is, the memory unit 108 includes the memories corresponding to the plural pair of shoes, respectively. For example, in the memory unit 108, a memory A stores the cumulative value of the number of steps and the cumulative value of the wear degree corresponding to a pair of shoes A, and a memory B stores of the cumulative value of the number of steps and the cumulative value of the wear degree corresponding to a pair of shoes B. The CPU 101 calculates the cushioning properties of the shoes selected by the input unit 106 and displays the calculated cushioning properties of the shoes on the display unit 107.

Figure 8:
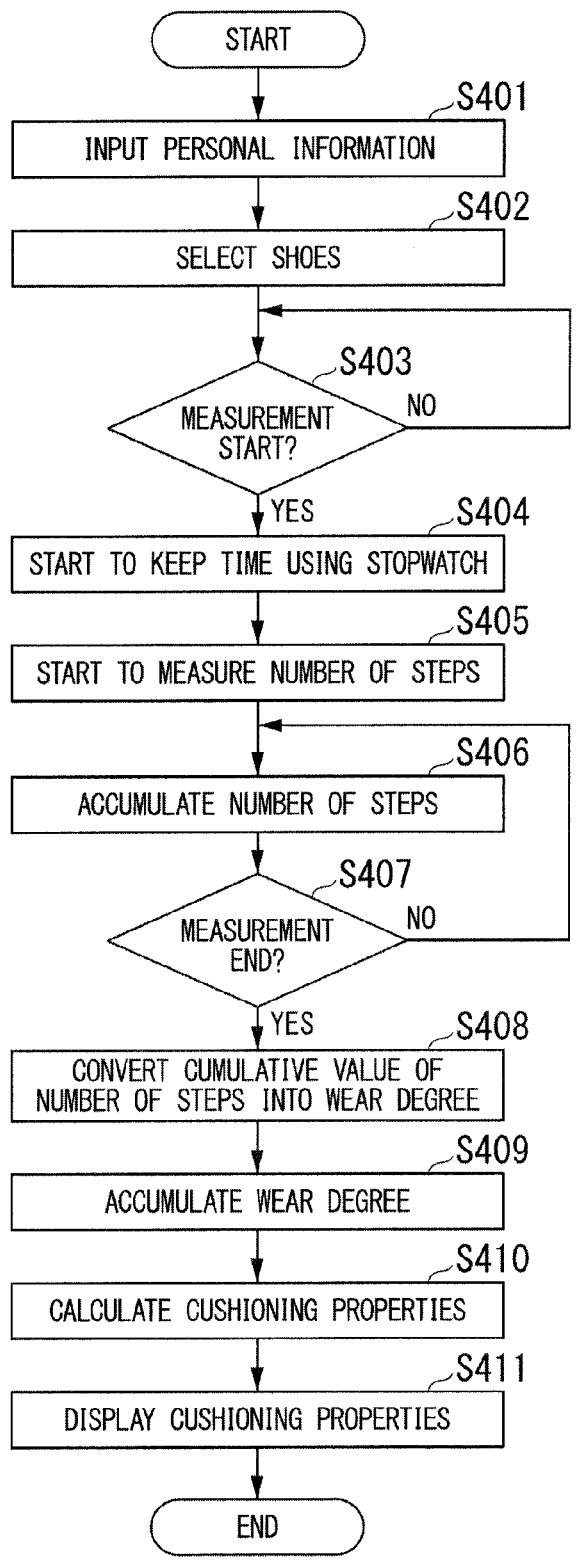
FIG. 8 is a flowchart illustrating the procedure of a cushioning property display process which is executed by a wristwatch according to a fourth embodiment of the present invention.

Hereinafter, a cushioning property display process where the wristwatch 100 according to the embodiment displays the cushioning properties of the shoes on the display unit 107 will be described. FIG. 8 is a flowchart illustrating the procedure of the cushioning property display process which is executed by the wristwatch 100 according to the embodiment.

(Step S401) The CPU 101 receives an input of personal information, which is the information relating to the user, from the input unit 106. The user inputs the personal information by manipulating the input unit 106. The input personal information described herein is the body weight of the user and the running level or gender of the user. Next, the process proceeds to Step S402.

(Step S402) The CPU 101 receives an input of the selection of shoes from the input unit 106. Next, the process proceeds to Step S403.

Since the processes of Step S403 to Step S408 are the same as the above-described processes of Step S102 to Step S107, the description thereof will be omitted.

(Step S409) After Step S408, the CPU 101 reads the cumulative value of the wear degree, which corresponds to the shoes selected in Step S402, from the memory unit 108, and adds the calculated wear degree to the read cumulative value to accumulate the wear degree. The CPU 101 writes the memory unit 108 with the accumulated wear degree as a cumulative value of the wear degree of the shoes selected in Step S402. In addition, the CPU 101 reads the cumulative value of the number of steps, which corresponds to the shoes selected in Step S402, from the memory unit 108, and adds the measured number of steps to the read cumulative value to overwrite the memory unit 108. Next, the process proceeds to Step S410.

(Step S410) The CPU 101 calculates the cushioning properties of the shoes selected in Step S402 based on the accumulated wear degree. Next, the process proceeds to Step S411.

(Step S411) The CPU 101 displays the display content indicating the calculated cushioning properties on the display unit 107. Next, the cushioning property display process ends.

As described above, in the embodiment, the input unit 106 receives an input of the selection of shoes. In addition, the CPU 101 calculates and displays the cushioning properties of the selected shoes. As a result, when the user uses plural pairs of shoes, the cushioning properties can be calculated and displayed for each pair of shoes of the user.

(Fifth Embodiment)

Hereinafter, a fifth embodiment of the present invention will be described with reference to the drawings. A wristwatch 100 according to this embodiment has the same configuration as that of the wristwatch 100 according to the first embodiment. This embodiment has a difference from the first embodiment, in that the cushioning properties are calculated and displayed for each pair of shoes of the user. In the fourth embodiment, the user inputs shoes to be used. However, in this embodiment, the wristwatch 100 automatically determines the currently-used shoes of the user based on the traveling speed of the user. The memory unit 108 stores the cumulative value of the wear degree for each pair of shoes of the user. Specifically, the memory unit 108 includes plural memories, and each memory stores the cumulative value of the number of steps and the cumulative value of the wear degree corresponding to a pair of shoes. That is, the memory unit 108 includes the memories corresponding to the plural pair of shoes, respectively. For example, in the memory unit 108, a memory A stores the cumulative value of the number of steps and the cumulative value of the wear degree corresponding to a pair of shoes A, and a memory B stores of the cumulative value of the number of steps and the cumulative value of the wear degree corresponding to a pair of shoes The memory unit 108 stores the range of the traveling speed for each pair of shoes of the user. For example, the memory unit 108 stores "speed×per hour or slower" as the range of the traveling speed corresponding to shoes for a practice, and stores "speed×per hour or faster" as the range of the traveling speed corresponding to shoes for a race. The CPU 101 calculates the traveling speed of the user by integrating the acceleration detected by the acceleration sensor included in the body movement detecting unit 105. The CPU 101 (select unit) reads shoes, which correspond to the calculated traveling speed, from the memory unit 108 and selects the read shoes as the currently-used shoes of the user.

Figure 9:
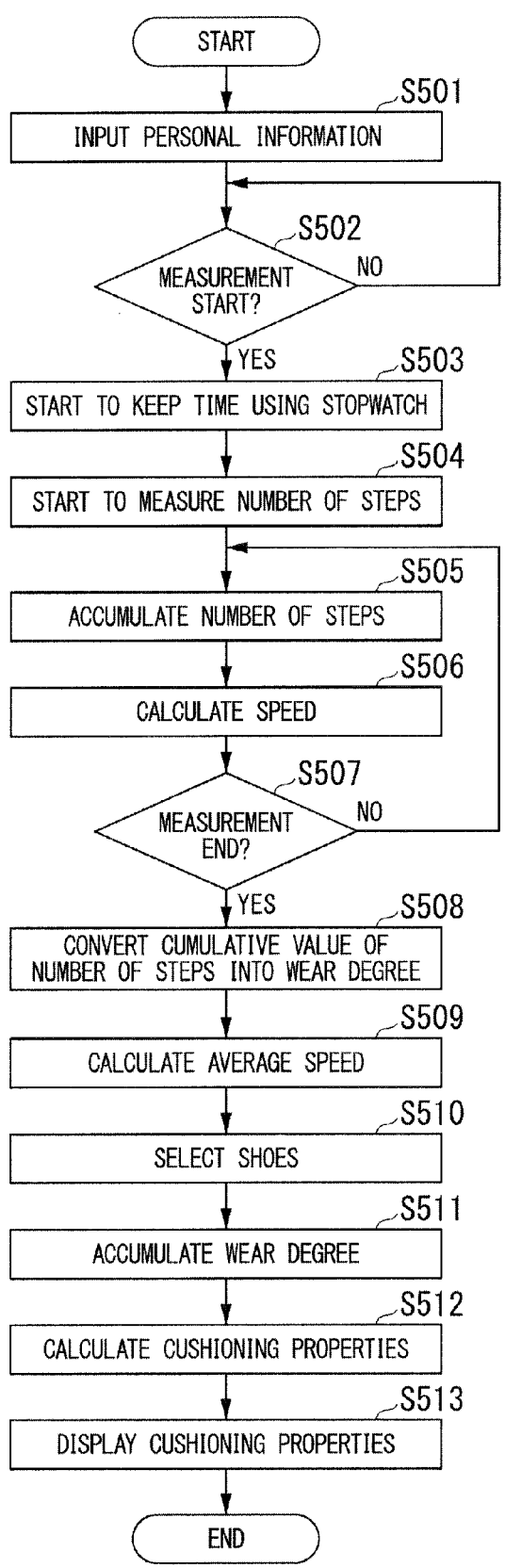
FIG. 9 is a flowchart illustrating the procedure of a cushioning property display process which is executed by a wristwatch according to a fifth embodiment of the present invention.

Hereinafter, a cushioning property display process where the wristwatch 100 according to the embodiment displays the cushioning properties of the shoes on the display unit 107 will be described. FIG. 9 is a flowchart illustrating the procedure of the cushioning property display process which is executed by the wristwatch 100 according to the embodiment.

Since the processes of Step S501 to Step S505 are the same as the above-described processes of Step S101 to Step S105, the description thereof will be omitted.

(Step S506) After Step S505, the CPU 101 calculates the traveling speed of the user by integrating the acceleration detected by the acceleration sensor included in the body movement detecting unit 105. Next, the process proceeds to Step S507.

(Step S507) The CPU 101 determines whether or not an instruction to end the measurement of the number of steps is input from the input unit 106. When the instruction to end the measurement is input, the CPU 101 ends the timekeeping of the stopwatch and the measurement of the number of steps. The process proceeds to Step S508. On the other hand, when the instruction to end the measurement is not input, the process returns to Step S505.

(Step S508) The CPU 101 converts the measured number of steps into the wear degree. A method of converting the number of steps into the wear degree is the same as in the first embodiment. Next, the process proceeds to Step S509.

(Step S509) The CPU 101. calculates an average value of the traveling speed calculated in Step S506. Next, the process proceeds to Step S510.

(Step S510) The CPU 101 reads shoes, which correspond to the average value of the traveling speed, from the memory unit 108 and selects the read shoes as the currently-used shoes of the user. Next, the process proceeds to Step S511.

(Step S511) The CPU 101 reads the cumulative value of the wear degree, which corresponds to the shoes selected in Step S510, from the memory unit 108, and adds the calculated wear degree to the read cumulative value to accumulate the wear degree. The CPU 101 writes the memory unit 108 with the accumulated wear degree as a cumulative value of the wear degree of the shoes selected in Step S510. In addition, the CPU 101 reads the cumulative value of the number of steps, which corresponds to the shoes selected in Step S510, from the memory unit 108, and adds the measured number of steps to the read cumulative value to overwrite the memory unit 108. Next, the process proceeds to Step S512.

(Step S512) The CPU 101 calculates the cushioning properties of the shoes selected in Step S510 based on the accumulated wear degree. Next, the process proceeds to Step S513.

(Step S513) The CPU 101 displays the display content indicating the calculated cushioning properties on the display unit 107. Next, the cushioning property display process ends.

As described above, in the embodiment, the CPU 101 automatically determines the currently-used shoes of the user based on the traveling speed of the user, and calculates and displays the determined cushioning properties of the shoes. As a result, when the user uses plural pairs of shoes, the cushioning properties can be calculated and displayed for each pair of shoes of the user. In addition, since the currently-used shoes of the user are automatically determined, it is not necessary that the user directly input the selection of shoes.

(Sixth Embodiment)

Hereinafter, a sixth embodiment of the present invention will be described with reference to the drawings. A wristwatch 100 according to this embodiment has the same configuration as that of the wristwatch 100 according to the first embodiment. This embodiment has a difference from the first embodiment, in that, when a replacement period of the shoes is reached (that is, when the cushioning properties of the shoes approximately reach the limit), the CPU 101 causes a warning to be lighted on the display unit 107. Specifically, when the cumulative value of the wear degree is a predetermined threshold value $\alpha$ or higher, the CPU 101 determines that the replacement period of the shoes is reached and causes a warning to be lighted on the display unit 107.

Figure 10:
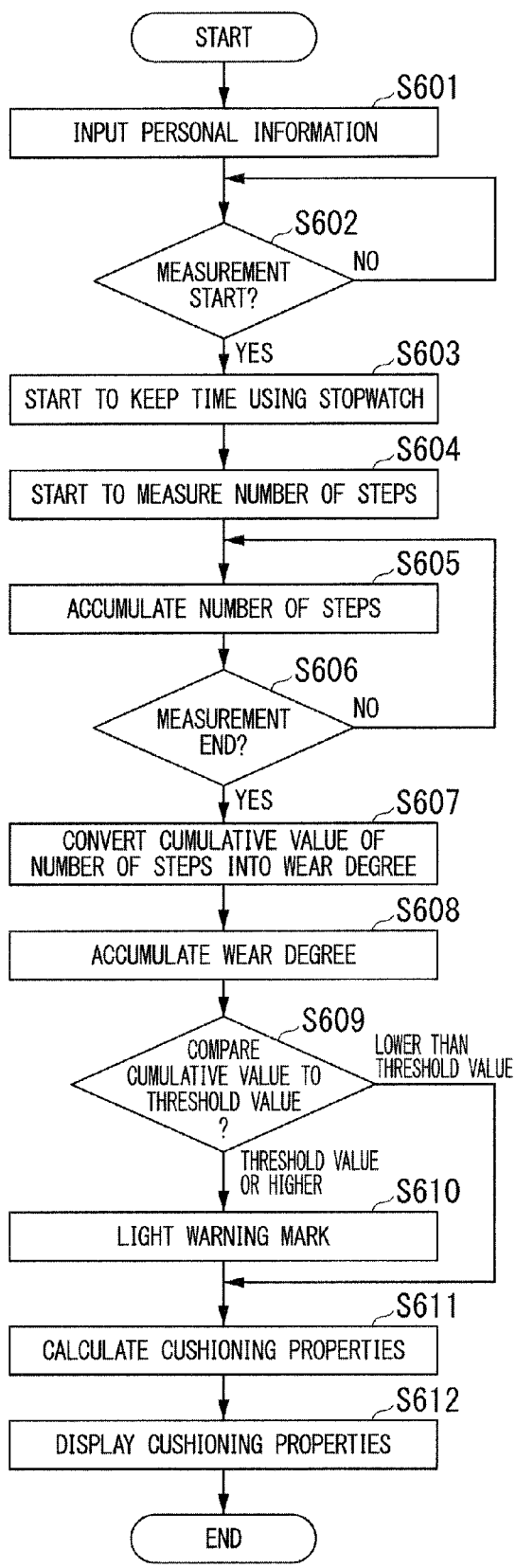
FIG. 10 is a flowchart illustrating the procedure of a cushioning property display process which is executed by a wristwatch according to a sixth embodiment of the present invention.

Hereinafter, a cushioning property display process where the wristwatch 100 according to the embodiment displays the cushioning properties of the shoes on the display unit 107 will be described. FIG. 10 is a flowchart illustrating the procedure of the cushioning property display process which is executed by the wristwatch 100 according to the embodiment.

Since the processes of Step S601 to Step S608 are the same as the above-described processes of Step S101 to Step S108, the description thereof will be omitted.

(Step S609) After Step S608, the CPU 101 compares the cumulative value of the wear degree to the predetermined threshold value $\alpha$. When the cumulative value of the wear degree is the threshold value $\alpha$ or higher, the process proceeds to Step S610. When the cumulative value of the wear degree is lower than the threshold value $\alpha$, the process proceeds to Step S611.

(Step S610) The CPU 101 causes a warning mark to be lighted on the display unit 107, in which the warning mark indicates that the cushioning properties of the currently-used shoes of the user reach the limit and indicates the replacement period of the shoes. Next, the process proceeds to Step S611.

Since the processes of Step 611 to Step S612 are the same as the above-described processes of Step S109 to Step S110, the description thereof will be omitted.

In the embodiment, the CPU 101 causes the warning to be lighted on the display unit 107. However, the present invention is not limited to this configuration as long as the user can be notified that the cushioning properties of the shoes reach the limit. For example, the message "please buy and replace new shoes" may be displayed on the display unit 107, or a warning sound may be output from the alarm unit 103.

As described above, in the embodiment, when the replacement period of the shoes is reached, the CPU 101 displays the warning on the display unit 107. As a result, the user recognizes that the cushioning properties of the shoes reach the limit and recognizes that the shoes should be bought and replaced.

A part or all of the functions of the respective units included in the wristwatches 100 according to the first embodiment to the sixth embodiment described above may be realized by recording a program for realizing these functions on a computer-readable recording medium and causing a computer system to read and execute this program recorded on the recording medium. The "computer system" described herein includes OS and hardware such as peripheral devices.

In addition, the "computer-readable recording medium" includes portable mediums such as a flexible disc, a magneto-optic disc, a ROM, and a CD-ROM; and storages such as a hard disc built into a computer system. Further, the "computer-readable recording medium" may include the following mediums: mediums on which a program is dynamically stored for a short period of time, for example, a network such as the Internet or a communication line such as a telephone line through which a program is transmitted; and mediums on which a program is stored for a predetermined amount of time, for example, a volatile memory which is built into a computer system functioning as a server or a client. In addition, the program may realize a part of the above-described functions or may realize the above-described functions in combination with a program stored in a computer system in advance.

Hereinabove, the embodiments of the present invention have been described. However, the present invention is not limited to the above-described embodiments, and various modifications can be added within a range not departing from the scope of the present invention.

For example, in the above-described embodiments, the CPU 101 causes the cushioning properties of the shoes to be displayed by graphics. However, the present invention is not limited to this configuration as long as the content which allows the user to check the cushioning properties of the shoes is displayed. For example, the CPU 101 may cause the cushioning properties of the shoes to be displayed on the display unit 107 in percentage. Alternatively, the CPU 101 may cause the cushioning properties of the shoes to be displayed on the display unit 107 by target display (comfortable/limit). In this case, in the CPU 101, a case where the cushioning properties of the shoes are a predetermined threshold value $\beta$ or higher is evaluated as "comfortable", and a case where the cushioning properties of the shoes are lower than the predetermined threshold value $\beta$ is evaluated as "limit". Alternatively, the CPU 101 may cause the cushioning properties of the shoes to be displayed on the display unit 107 by an animation or a graph.

In addition, in the above-described embodiments, the CPU 101 converts the number of steps into the wear degree using the coefficient a in consideration of the body weight of the user, the coefficient b in consideration of the traveling speed of the user, and the coefficient c in consideration of the running level of the user. However, the present invention is not limited to this configuration, but the CPU 101 may convert the number of steps into the wear degree using one or two or more of the above-described coefficients a and b.

Alternatively, the CPU 101 may convert the number of steps into the wear degree without using the coefficients in consideration of the information relating to the user.

In addition, in the above-described embodiments, the information relating to the user has been described using the body weight, the traveling speed, and the running level as an example, but the present invention is not limited thereto. For example, the CPU 101 may convert the number of steps into the wear degree using coefficients in consideration of information relating to other users such as gender, characteristics of shoes, or a traveling pitch.

In addition, in the above-described embodiments, the wristwatch 100 has been described as an example of the electronic apparatus, but the present invention is not limited thereto. For example, the electronic apparatus may be any of a mobile phone, a smartphone, a pedometer, and the like as long as it can be carried by the user during traveling.

Figure 11A:
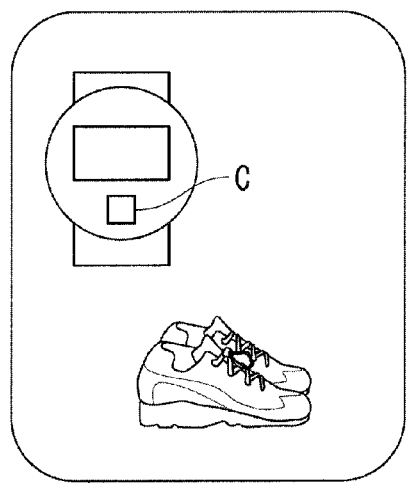
FIG. 11A is a diagram illustrating an example of the present invention in which an acceleration sensor for the measuring number of steps of a user is built into a wristwatch 100.
Figure 11B:
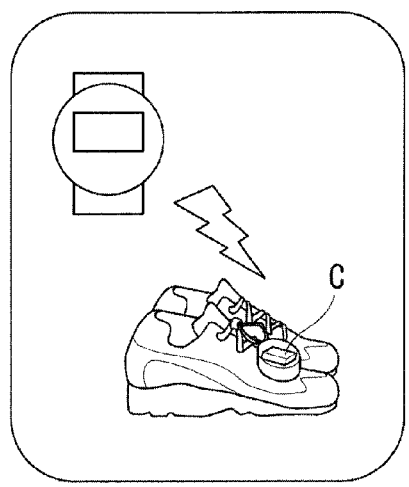
FIG. 11B is a diagram illustrating an example of the present invention in which an acceleration sensor for measuring the number of steps of a user is built into a peripheral apparatus which is mountable on the outside of the shoes (for example, a shoelace).
Figure 11C:
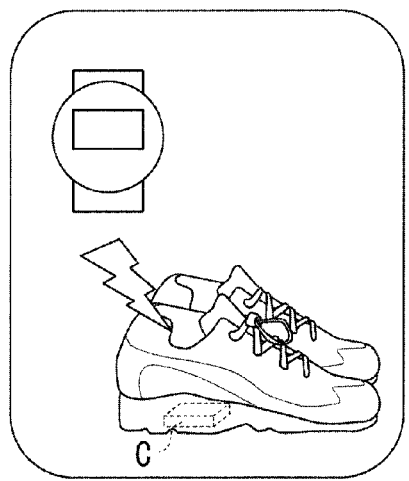
FIG. 11C is a diagram illustrating an example of the present invention in which an acceleration sensor for measuring the number of steps of a user is built into shoes of the user.

In addition, in the above-described embodiments, the acceleration sensor for measuring the number of steps of the user is built into the wristwatch 100, but the present invention is not limited thereto. The acceleration sensor may be mounted at a position at which the number of steps of the user can be measured. FIGS. 11A, 11B, and 11C are diagrams illustrating examples of mounting positions of the acceleration sensor C for measuring the number of steps of the user.

In the example shown in FIG. 11A, the acceleration sensor C for measuring the number of steps of the user is built into the wristwatch 100. As a result, the wear degree of the shoes can be calculated without contact between the acceleration sensor C and the shoes of the user. In addition, when the user replaces the shoes, it is not necessary that the acceleration sensor C be mounted on another mounting position. In addition, when the acceleration sensor C is built into a midsole of the shoes, the cushioning properties of the midsole may deteriorate. However, deterioration in the cushioning properties of the midsole can be prevented by mounting the acceleration sensor C on the wristwatch 100.

In addition, in the above-described embodiments, the acceleration sensor detects the vertical body vibration of the user to measure the number of steps, but the present invention is not limited thereto. For example, the acceleration sensor may detect a vibration of arm swinging of the user to measure the number of steps. The vibration of the arm swinging of the user refers to the vibration generated when the arms of the user move back and forth, In addition, in the above-described embodiments, the cumulative value of the number of steps and the cumulative value of the wear degree can be initialized. However, the cumulative value of the number of steps and the cumulative value of the wear degree may be changed to arbitrary values instead of being initialized. For example, an instruction to change the cumulative values to arbitrary values may be received through a manipulation from the input unit 106. As a result, when initially using the electronic apparatus according to the embodiment, the user can set the cumulative values so as to match the wear state of the shoes used.

In an example shown in FIG. 11B, the acceleration sensor C for measuring the number of steps of the user is built into a peripheral apparatus which is mountable on the outside of the shoes (for example, a shoelace) This peripheral apparatus can wirelessly communicate with the wristwatch 100 and transmits the acceleration detected by the acceleration sensor C to the wristwatch 100. By mounting the acceleration sensor C on the peripheral apparatus, the acceleration sensor C can be easily mounted on another mounting position when the user replaces the shoes.

In the example shown in FIG. 11C, the acceleration sensor C for measuring the number of steps of a user is built into the shoes of the user. The mounting position of the acceleration sensor C is a midsole of the shoes. The communication unit is built into the midsole so as to wirelessly transmit the acceleration detected by the acceleration sensor C to the wristwatch 100. By mounting the acceleration sensor C on the shoes, the accuracy of the pedometer can be improved. In addition, it is not necessary to install the acceleration sensor C. Instead of the acceleration sensor C, a piezoelectric element for measuring the number of steps of the user may be built into the midsole of the shoes.

Figure 12:
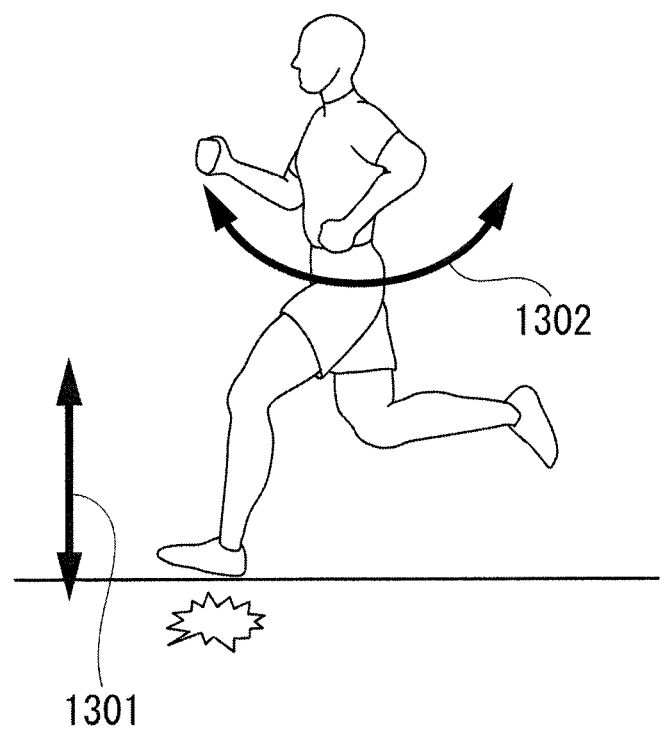
FIG. 12 is a diagram illustrating an example of a method according to the present invention of measuring the number of steps using an acceleration sensor.

FIG. 12 is a diagram illustrating an example of a method of measuring the number of steps using the acceleration sensor. As shown in this drawing, examples of the method of measuring the number of steps using the acceleration sensor include a method of detecting a vertical direction 1301 of the user; and a method of detecting a vibration 1302 of arm swinging of the user. In the method of detecting the vertical body vibration 1301 of the user, when detecting the vertical body vibration 1301 of the user once, the body movement detecting unit 105 increases the number of steps by one. That is, in the method of detecting the vertical body vibration 1301 of the user, the cycle of the vibration and the number of steps are synchronized with each other.

On the other hand, in the method of detecting the vibration 1302 of arm swinging of the user, when detecting the vibration 1302 of arm swinging of the user once, the body movement detecting unit 105 increases the number of steps by two. That is, in the method of detecting the vibration 1302 of arm swinging of the user, the cycle of the vibration is ½ of the number of steps.

For example, when the acceleration sensor is built into the wristwatch 100, the number of steps of the user can be detected using any of the method of detecting the vertical body vibration 1301 of the user; and the method of detecting the vibration 1302 of arm swinging of the user. On the other hand, when the acceleration sensor is mounted on the peripheral apparatus or the shoes, the method of detecting the vertical vibration 1301 of the user is preferably used.

REFERENCE SYMBOL LIST

100 WRISTWATCH
101 CPU
102 VIBRATING UNIT
103 ALARM UNIT
104 ILLUMINATION UNIT
105 BODY MOVEMENT DETECTING UNIT
106 INPUT UNIT
107 DISPLAY UNIT
108 MEMORY UNIT
109 POWER SUPPLY UNIT
110 COMMUNICATION UNIT

The invention claimed is:

1. An electronic apparatus comprising:
   a wristwatch body that is provided separately from and is not incorporated to a shoe that is worn by a user;
   a sensor that is built into the wristwatch body and that detects a number of steps taken by the user during traveling while wearing the shoe;
   a processing circuit provided on the wristwatch body to:
      obtain, based on a detection result of the sensor, a number of steps taken by the user during traveling while wearing the shoe; and
      calculate a wear degree, indicating a degree to which the shoe of the user is worn out, based on the number of obtained steps; and
   a display that is provided on the wristwatch body and on which information relating to the calculated wear degree is displayed.

2. The electronic apparatus according to claim 1, wherein the processing circuit is further provided to convert the number of obtained steps into the wear degree using a coefficient in consideration of information relating to the user.

3. The electronic apparatus according to claim 2, wherein the information relating to the user includes at least one of a body weight of the user, a traveling speed of the user, a running level of the user, and a gender of the user.

4. The electronic apparatus according to claim 1, further comprising:
   a memory provided on the wristwatch body to store a cumulative value of the wear degree;
   wherein the processing circuit is further provided to:
      add the calculated wear degree to the cumulative value of the wear degree, which is stored in the memory, to calculate a new cumulative value of the wear degree;
      calculate cushioning properties of the shoe based on the new cumulative value of the wear degree; and
      control the display to display the calculated cushioning properties of the shoe.

5. The electronic apparatus according to claim 4, wherein the memory is further provided to store a plurality of cumulative values of the wear degree for a respective plurality of shoes worn by the user; and
   wherein the processing circuit is further provided to:
      recognize one shoe as selected from the plurality of shoes;
      read the cumulative value of the wear degree for the one shoe from the memory;

add the calculated the wear degree to the read cumulative value of the wear degree to calculate a new cumulative value of the wear degree for the one shoe; and calculate cushioning properties of the one shoe based on the new cumulative value of the wear degree.

6. The electronic apparatus according to claim 4, wherein the processing circuit is further provided to, based on an instruction, initialize the cumulative value of the wear degree stored in the memory.

7. The electronic apparatus according to claim 1, wherein the sensor includes an acceleration sensor.

8. The electronic apparatus according to claim 1, wherein:
the sensor includes an acceleration sensor; and
the processing circuit is further provided to:
obtain a traveling pitch of the user within a predetermined amount of time based on a detection result of the acceleration sensor, and
obtain a number of steps of the user during traveling based on the traveling pitch and a traveling time of the user.

9. The electronic apparatus according to claim 1, further comprising:
a memory provided on the wristwatch body in communication with the processing circuit for storing a value of the wear degree calculated by the processing circuit, the display being configured to display a cushioning property of the shoe based on the wear degree stored in the memory; and
an input unit provided on the wristwatch body for inputting personal information of the user, the personal information including at least one of a body weight of the user, a traveling speed of the user, a running level of the user, and a gender of the user;
wherein the processing circuit is further provided to calculate the wear degree based on the inputted personal information.

10. An electronic apparatus according to claim 1, further comprising:
a memory provided on the wristwatch body to store a plurality of cumulative values of the wear degree; and
a selection inputter provided on the wristwatch body to receive an input of one shoe, selected by the user, from a plurality of shoes displayed on the display;
wherein the processing circuit is further provided to:
read the cumulative value of the wear degree for the one shoe from the memory; and
add the calculated wear degree to the read cumulative value of the wear degree to obtain a new cumulative value of the wear degree for the one shoe.

11. A non-transitory computer-readable medium storing a computer program which, when executed by a computer in an electronic apparatus, causes the computer to:
obtain, based on a detection result of a sensor, a number of steps taken by a user during traveling while wearing a shoe;
calculate a wear degree, indicating a degree to which the shoe of the user is worn out, based on the number of steps obtained; and
display information relating to the calculated wear degree on a display;
wherein the computer and the sensor are built into a wristwatch body of the electronic apparatus that is separate from and is not incorporated to the shoe.

12. The non-transitory computer-readable medium according to claim 11, wherein the stored computer program, when executed by the computer, further causes the computer to:
store in a memory a plurality of cumulative values of the wear degree; and
receive by a selection inputter an input of one shoe, selected by the user, from a plurality of shoes displayed on the display;
read the cumulative value of the wear degree for the one shoe from the memory; and
add the calculated wear degree to the read cumulative value of the wear degree to obtain a new cumulative value of the wear degree for the one shoe.

13. An electronic apparatus for measuring a degree of wear of a shoe worn by a user, the electronic apparatus comprising:
a wrist-worn body provided separately from and not incorporated to the shoe;
a sensor built into the wrist-worn body for detecting a number of steps taken by the user while wearing the shoe;
a processor mounted to the wrist-worn body for performing a processing operation to calculate the degree of wear of the shoe based on the number of steps detected by the sensor; and
a display provided on the wrist-worn body and on which information relating to the calculated degree of wear is displayed.

14. An electronic apparatus according to claim 13, further comprising:
a memory provided on the wristwatch body to store a plurality of cumulative values of the wear degree; and
a selection inputter provided on the wristwatch body to receive an input of one shoe, selected by the user, from a plurality of shoes displayed on the display;
wherein the processing circuit is further provided to:
read the cumulative value of the wear degree for the one shoe from the memory; and
add the calculated wear degree to the read cumulative value of the wear degree to obtain a new cumulative value of the wear degree for the one shoe.

15. An electronic apparatus according to claim 13, wherein the wrist-worn body comprises a wristwatch.

* * * * *